(12) United States Patent
Jia et al.

(10) Patent No.: US 11,876,576 B2
(45) Date of Patent: Jan. 16, 2024

(54) METHODS, APPARATUS AND SYSTEM FOR BIDIRECTIONAL WIRELESS CHARGING IN WEARABLE DEVICES

(71) Applicant: Google LLC, Mountain View, CA (US)

(72) Inventors: Liang Jia, Palo Alto, CA (US); Jae-Won Hwang, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/746,011

(22) Filed: May 17, 2022

(65) Prior Publication Data

US 2022/0278710 A1    Sep. 1, 2022

Related U.S. Application Data

(63) Continuation of application No. 16/986,522, filed on Aug. 6, 2020, now Pat. No. 11,356,146.

(Continued)

(51) Int. Cl.
*H02J 50/80* (2016.01)
*H02J 50/12* (2016.01)
(Continued)

(52) U.S. Cl.
CPC ........ *H04B 5/0037* (2013.01); *H02J 7/00032* (2020.01); *H02J 7/02* (2013.01);
(Continued)

(58) Field of Classification Search
CPC ........ H04H 5/0037; H02J 50/80; H02J 50/12; H02J 7/00032; H02J 7/02
See application file for complete search history.

(56) References Cited

U.S. PATENT DOCUMENTS

| 9,331,731 B2 * | 5/2016 | Wang | H04B 1/385 |
| 9,834,105 B2 * | 12/2017 | Desai | B60R 16/03 |

(Continued)

FOREIGN PATENT DOCUMENTS

| CN | 204597504 U | 8/2015 |
| CN | 104935062 A | 9/2015 |

(Continued)

OTHER PUBLICATIONS

Elixmann, Inga et al. Transcutaneous Energy Transfer System Incorporating a Datalink for a Wearable Autonomous Implant. 2012 Ninth International Conference on Wearable and Implantable Body Sensor Networks (BSN), 2012 IEEE, May 9, 2012 (May 9, 2012), pp. 1-5, XP032182904, DOI: 10.1109/BSN.2012.13.

(Continued)

*Primary Examiner* — Lincoln D Donovan
*Assistant Examiner* — Alex W Lam
(74) *Attorney, Agent, or Firm* — Lerner David LLP

(57) ABSTRACT

The technology provides for a wearable device including a body and an accessory adapted to be attached to the body. The body includes a first coil configured to inductively transmit power. The body may further include first power management circuitry configured to control the first coil to transmit power according to a wireless charging standard, and to modulate the power transmitted through the first coil to transmit data according to a wireless communication standard. The accessory may include a second coil configured to inductively receive power. The accessory may further include second power management circuitry configured to control the second coil to receive the power transmitted through the first coil according to the wireless charging standard, and to control the second coil to receive the data transmitted through the first coil according to the wireless communication standard.

17 Claims, 12 Drawing Sheets

Related U.S. Application Data

(60) Provisional application No. 62/885,891, filed on Aug. 13, 2019.

(51) Int. Cl.
 *H02J 7/02* (2016.01)
 *H04B 5/00* (2006.01)
 *H02J 7/00* (2006.01)

(52) U.S. Cl.
 CPC .............. *H02J 50/12* (2016.02); *H02J 50/80* (2016.02); *H04B 5/0081* (2013.01)

(56) References Cited

U.S. PATENT DOCUMENTS

| | | | |
|---|---|---|---|
| 10,027,169 | B2 | 7/2018 | Masumoto et al. |
| 10,193,372 | B2 | 1/2019 | Herbst et al. |
| 10,291,082 | B2 | 5/2019 | Onishi |
| 2013/0005251 | A1 | 1/2013 | Soar |
| 2014/0177399 | A1 | 6/2014 | Teng et al. |
| 2015/0195009 | A1* | 7/2015 | Wang .................. H04M 1/0254 455/573 |
| 2015/0261189 | A1 | 9/2015 | Connolly |
| 2016/0072536 | A1* | 3/2016 | Wang .................. H04B 5/0037 455/566 |
| 2016/0091922 | A1* | 3/2016 | Nazzaro ............... G04G 21/025 307/104 |
| 2016/0285311 | A1 | 9/2016 | Masumoto et al. |
| 2017/0127196 | A1 | 5/2017 | Blum et al. |
| 2017/0136886 | A1* | 5/2017 | Desai ..................... B60R 16/03 |
| 2017/0338681 | A1* | 11/2017 | Lim ........................ H02J 50/80 |
| 2018/0210491 | A1 | 7/2018 | Song et al. |
| 2018/0259914 | A1 | 9/2018 | Chae |
| 2019/0123588 | A1* | 4/2019 | Kim ........................ H01F 27/40 |
| 2019/0165516 | A1 | 5/2019 | Li et al. |
| 2020/0073337 | A1 | 3/2020 | Wang et al. |
| 2020/0083737 | A1 | 3/2020 | Dai |

FOREIGN PATENT DOCUMENTS

| | | |
|---|---|---|
| JP | 3190075 U | 3/2014 |
| JP | 2016-181953 A | 10/2016 |
| JP | 2017-050939 A | 3/2017 |
| WO | 2018/103021 A1 | 6/2018 |

OTHER PUBLICATIONS

International Search Report and Written Opinion for International Application No. PCT/US2020/045188 dated Oct. 21, 2020. 15 pages.
International Preliminary Report on Patentability for International Application No. PCT/US2020/045188 dated Feb. 24, 2022. 8 pages.
Office Action for Japanese Patent Application No. 2022-508936 dated Apr. 25, 2023. 5 pages.

* cited by examiner

FIGURE 4C

Frequency Modulation FSK states — 470

| Polarity | Depth | $\frac{1}{f_{mod}} - \frac{1}{f_{op}}$ Minimum | $\frac{1}{f_{mod}} - \frac{1}{f_{op}}$ Maximum | Unit |
|---|---|---|---|---|
| positive | 3 | −282.00 | −249.00 | ns |
| positive | 2 | −157.00 | −124.00 | ns |
| positive | 1 | −94.50 | −61.50 | ns |
| positive | 0 | −63.25 | −30.25 | ns |
| negative | 0 | 30.25 | 63.25 | ns |
| negative | 1 | 61.50 | 94.50 | ns |
| negative | 2 | 124.00 | 157.00 | ns |
| negative | 3 | 249.00 | 282.00 | ns |

METHODS, APPARATUS AND SYSTEM FOR BIDIRECTIONAL WIRELESS CHARGING IN WEARABLE DEVICES

CROSS-REFERENCE TO RELATED APPLICATION

This application claims the benefit of the filing date of U.S. Provisional Patent Application No. 62/885,891 filed Aug. 13, 2019, which is a continuation of U.S. patent application Ser. No. 16/986,522 filed Aug. 6, 2020, the disclosures of which are hereby incorporated herein by reference.

BACKGROUND

Wearable devices, such as smartwatches and smart glasses, may provide many similar functions as other personal computing devices. Due to their proximity to the wearer, some wearable devices may provide additional functions not ordinarily provided by traditional computing devices, such as heart rate and body temperature monitors. Where the wearable devices have small form factors, implementing such additional functionalities may be especially challenging due to space constraints.

Wearable devices are often designed for easy portability. For instance, they may be provided with accessories such as a watch band or a glass frame adapted to be worn by a wearer. Such accessories are often purely mechanical, since including electronic components in the accessories may be difficult in a number of ways. For example, including electronic components in a watch band of a smartwatch may increase size and/or weight of the watch band, making the smartwatch less portable or attractive. Batteries for powering the electronic components may further increase weight and/or size of the watch band. Still further, if electrical connections such as wires or contact pins are to be provided between electronic components in a watch body of the smartwatch and electronic components in the watch band, and where the watch body and watch band may be detached to expose the electrical connections, such electrical connections may limit the water-proof capabilities of the smartwatch.

BRIEF DESCRIPTION OF THE DRAWINGS

FIG. 4C is an example table of frequency shift key states according to Qi standard.

DETAILED DESCRIPTION

Overview

Figure 1:
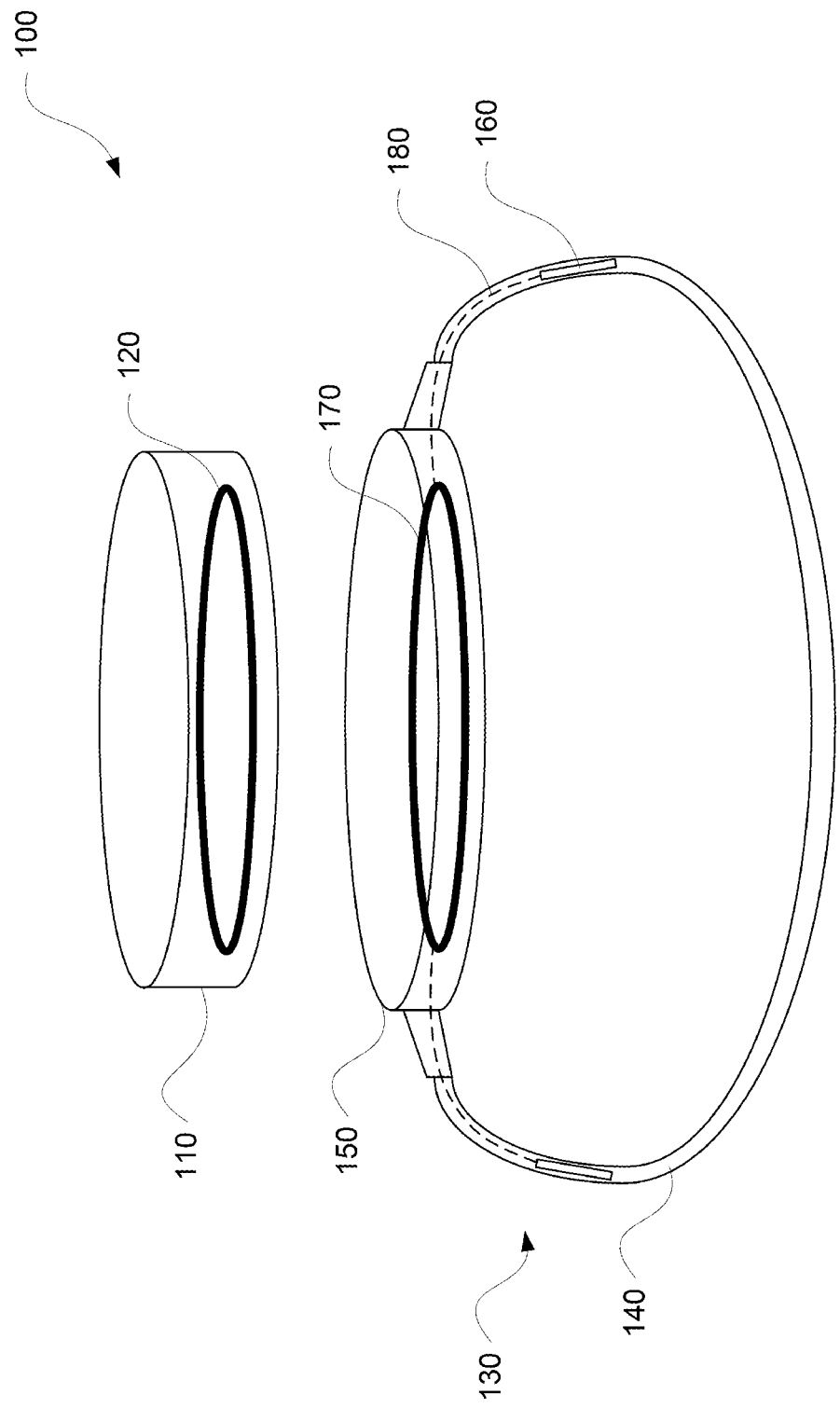
FIG. 1 is a pictorial diagram illustrating an example wearable device in accordance with aspects of the disclosure.

The present disclosure provides for a wearable device having a wireless charging and communication system. The wireless charging and communication system may enable bi-directional wireless communication and/or wireless charging between two components of the wearable device. For instance, the wearable device may include a body, such as a watch body or a smart glass display, and an accessory adapted to be attached to the body, such as a watch band or a glass frame. The body may be the portion of the wearable device that includes most of the main electronic components or functionalities, while the accessory may be the portion of the wearable device that includes rest of the electronic components or functionalities. The body of the wearable device may include a first coil configured to inductively transmit and/or receive power, and the accessory of the wearable device may include a second coil also configured to inductively transmit and/or receive power. For example, the power may be transmitted as electromagnetic waves.

The body of the wearable device and the accessory of the wearable device may each include a respective power management circuitry configured to control the respective coils to transmit and/or receive power according to a wireless charging standard. For example, the wireless charging standard may be a Qi standard, a Near-Field Communication (NFC) standard, or another standard.

The power management circuitry in the body and the accessory of the wearable device may further be configured to modulate the transmitted or received power to wirelessly transmit data. For instance, the body and the accessory of the wearable device may be configured for bi-directional communication. In this regard, transmitting data from the body to the accessory may be via a first type of modulation, while transmitting data from the accessory to the body may be via a second type of modulation different from the first type of modulation. Example types of modulation include amplitude modulation, frequency modulation, load modulation, etc., and combinations thereof. As an alternative or in addition to modulating the transmitted power for data transmission, additional communication modules, such as Bluetooth modules, may be used for wireless data transmission.

The body and the accessory of the wearable device may each include controllers for controlling power transmission and/or reception. For example, controllers in the body may determine only to charge the accessory when the wearable device is being worn, when charges in a battery of the body meets a predetermined threshold, when the body is not currently being charged, etc. As another example, controllers in the body may determine not to charge the accessory when data received from the accessory indicate that the transmitted power does not meet requirements of the accessory. Similarly, controllers in the accessory may determine only to accept power from the body when the wearable device is being worn, when charges in a battery of the accessory falls below a predetermined threshold, when the body is not currently being charged, etc.

The features described herein are advantageous because they provide bi-directional wireless charging and communication capabilities between a body and accessory of a wireless device. Wireless charging and communication allow more functionalities to be incorporated into a wearable device without adding significant weight or volume, for example by including the additional components in the accessory without adding batteries in the accessory, since the accessory may be wirelessly charged. Wireless charging and communication may reduce or eliminate the need for electrical connections between the body and a modular accessory of a wearable device, which may improve water-proof or water-resistant capabilities. Wireless communication between the body and the accessory of a wearable device may allow smart and efficient charging based on various statuses of the body and/or the accessory as described herein. Over the air (OTA) software updates may also be performed by wireless communication, which may provide further convenience to users as the wearable device may be updated while being worn or used. Further, wireless communication between the body and modular accessories of a wearable device may provide easy customization and security options by linking user profiles with Radiofrequency Identifications (RFID) in the modular accessories.

Example Systems

FIG. 1 illustrates an example wearable device. In this example, the wearable device is a smartwatch 100. However, it should be understood that the wearable device may be any of a variety of wearable devices, such as pendants, head-mounted displays such as smart glasses, smart helmets, etc.

The smartwatch 100 includes a watch body 110. While in the example shown the watch body 110 is round in shape, the watch body 110 may be any shape, such as rectangular, square, oval, polygon, arbitrary shape, etc. Housing of the watch body 110 may be made out of a variety of materials, such as metal, plastic, glass, ceramics, or any combination of these or other material. Although not shown in FIG. 1, as described below in relation to FIG. 9, the watch body 110 may contain a number of electronic and/or mechanical components, which may include user input such as microphone, camera, touch screen; output devices such as display, speaker, haptics; one or more processors; memory; one or more sensors; wireless charging and communication systems; clocks; etc.

To wirelessly receive and/or transmit power, the watch body 110 may include one or more charging coils, such as charging coil 120. For instance, the charging coil 120 may be configured to receive power inductively from a charger. The charging coil 120 may further be configured to supply power to components inside the watch body 110, including one or more energy storages such as batteries. For example, electrical connections may be provided between the charging coil 120 and components inside the watch body 110. The charging coil 120 may also be configured to inductively supply power to other components of the smartwatch 100, such as components in or on accessories of the smartwatch 100.

The smartwatch 100 may include one or more accessories, such as a modular watch band 130. In other examples where the wearable device is a different device, the body of the device may be an eyeglass or a pendant, which may be integrated or adapted to modularly attach to an accessory such as eyeglass frame or necklace. The watch band 130 may be made out of a variety of materials, such as metal, rubber, nylon, cotton, plastic, glass, ceramics, or any combination of these or other material. The watch band 130 may be adapted to be worn around a person's wrist. For instance as shown, the watch band 130 includes a strap 140. The strap 140 may be adjusted to provide a secure and comfortable fit around the wrist of the wearer. In other examples, the watch band may be a bracelet, such as for a looser fit, or another type of attachment mechanism.

The watch band 130 may further include a receptacle 150 adapted to secure the watch body 110 of the smartwatch 100 to the watch band 130. For example, to accommodate the watch body 110, the receptacle 150 may have a similar shape as the watch body 110. Further, the receptacle 150 may include features such as grooves, hooks, locks, screws, pins, magnets, etc., which may interlock with features of the watch body 110 to ensure secure attachment. Although receptacle 150 is shown in this example, in other examples, the watch band 130 may include other mechanical features such as pins, screws, hooks, locks, etc. that secure the watch band 130 directly to the watch body 110.

To reduce the form factor of the smartwatch 100, and/or to include additional components without increasing the form factor of the watch body 110, the watch band 130 may be configured to contain electronic and/or mechanical components. For instance, electronic components 160 are shown positioned inside the strap 140. Alternatively or additionally, these electronic components may be positioned inside the receptacle 150. The electronic components 160 may include wireless communication systems for transferring and/or receiving data from components in the watch body 110, and from/to other devices. In some examples, electronic components 160 provided in the watch band 130 may be ones that operate better with closer proximity to the wearer's skin, such as heart rate or body temperature sensors, IR or capacitive sensors for detecting whether the smartwatch 100 is being worn, haptic feedback, etc. The electronic components 160 may further include identification and/or authentication devices, such as a Radio Frequency Identification (RFID) devices, which may be linked to a user profile or account. For example, the user profile or account may include information such as user preferences and other user data.

The watch band 130 may also include a charging coil 170 for wirelessly receiving and/or supplying power. For instance, the charging coil 170 may be configured to receive power inductively from a charger. The charging coil 170 may also be configured to receive power inductively from the watch body 110 of the smartwatch 100, such as via charging coil 120. To ensure alignment between the charging coil 120 and charging coil 170, the charging coil 170 may be positioned in the receptacle 150 of the watch band 130 such that, when the watch body 110 is secured in the receptacle 150, the two charging coils 120 and 170 align with each other. The charging coil 170 of the watch band 130 may be configured to supply power to the electronic components 160. In this regard, the watch band 130 may include electrical connections 180 that connect the charging coil 170 to the electronic components 160.

In some instances, the watch band 130 may include one or more energy storage units, such as one or more batteries. As such, the batteries may supply power to the electronic components 160 even when the watch band 130 is not being charged by a charger or the watch body 110. In other instances, to avoid making the watch band 130 bulky or heavy for the wearer, or where it may be unnecessary for the electronic components 160 to function without being attached to the watch body 110, the watch band 130 may not include an energy storage unit. For example, the electronic components 160 may include heart rate and body temperature sensors that are only intended to function when being worn with the watch body 110, which may analyze and display information based on the data from these sensors.

Since the watch body 110 and the watch band 130 are modular, the smartwatch 100 may be customized by replacing the watch band 130 with another watch band. For example, another watch band may include a different set of electronic components than electronic components 160 of the watch band 130. Thus, functionalities of the smartwatch 100 may be changed without changing components of the watch body 110. Further, where the watch bands include identification and/or authentication devices such as RFID devices, the smartwatch 100 may be customized based on preferences in a user profile linked to the RFID. Still further, the identification and/or authentication features may provide improved data security, for instance by only permitting the watch body 110 to access user data of the user associated with the RFID in the watch band 130.

Additionally, wireless charging and communication capabilities may improve water-proof or water-resistant features of the smartwatch 100. For instance, since the watch body 110 and the watch band 130 may both include wireless charging and/or communication capabilities, electrical connections such as wires or contact pins may not be needed between the watch body 110 and the watch band 130. As such, electronic components and charging coil 120 of the watch body 110 and electronic components 160 and charging coil 170 of the watch band 130 may not be exposed to contaminants such as dirt or water through exposed wires or contact pins, even if the watch body 110 is detached from the watch band 130. For instance, electronic components of the watch body 110 and charging coil 120 may be fully encased in the housing of the watch body 110, while the electronic components 160 and charging coil 170 of the watch band 130 may be fully encased in the material of the receptacle 150 or the strap 140.

Figure 2:
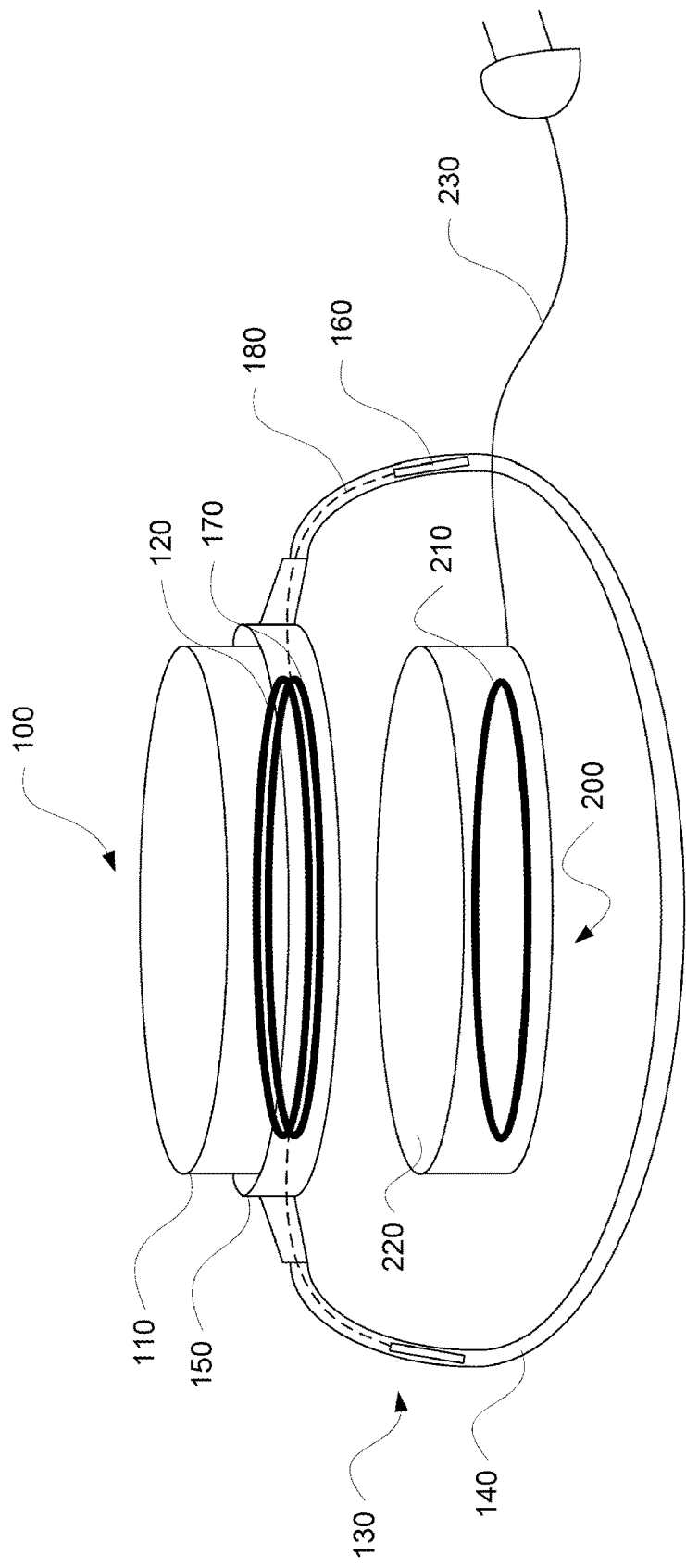
FIG. 2 is a pictorial diagram illustrating an example wearable device being charged by a charger in accordance with aspects of the disclosure.

FIG. 2 shows an example wearable device being charged by a charger. In this example, the wearable device is the smartwatch 100 of FIG. 1, and the charger is a wireless charger 200. The charger 200 may be configured to transmit power through induction, such as through charging coil 210. For instance, to be charged, a device with a charging coil, such as smartwatch 100, may be positioned on a surface 220 of the charger 200 such that the charging coil 120 aligns with the charging coil 210. The charger 200 may itself include a connection to a power source, such as a cable 230 for connecting to a power outlet.

The charger 200 may charge the smartwatch 100 in any of a number of ways. For instance, the charger 200 may transmit power inductively via charging coil 210 to the charging coil 120 of the watch body 110, the charging coil 120 may in turn transmit power inductively to the charging coil 170 of the watch band 130 when the watch band 130 is attached to the watch body 110. In some instances, the watch body 110 may be configured to charge the watch band 130 only when the smartwatch 100 is being worn. This may be the case if the watch band 130 does not include batteries, since without energy storage, it may be wasteful to charge the watch band 130 when not being worn. In instances where the watch band 130 does include batteries, the charger 200 may transmit power inductively via charging coil 210 simultaneously to both the charging coil 120 of the watch body 110 and the charging coil 170 of the watch band 130. Alternatively, the charger 200 may transmit power inductively via charging coil 210 to the charging coil 170 of the watch band 130, which may in turn transmit power to the charging coil 120 of the watch body 110.

Figure 3:
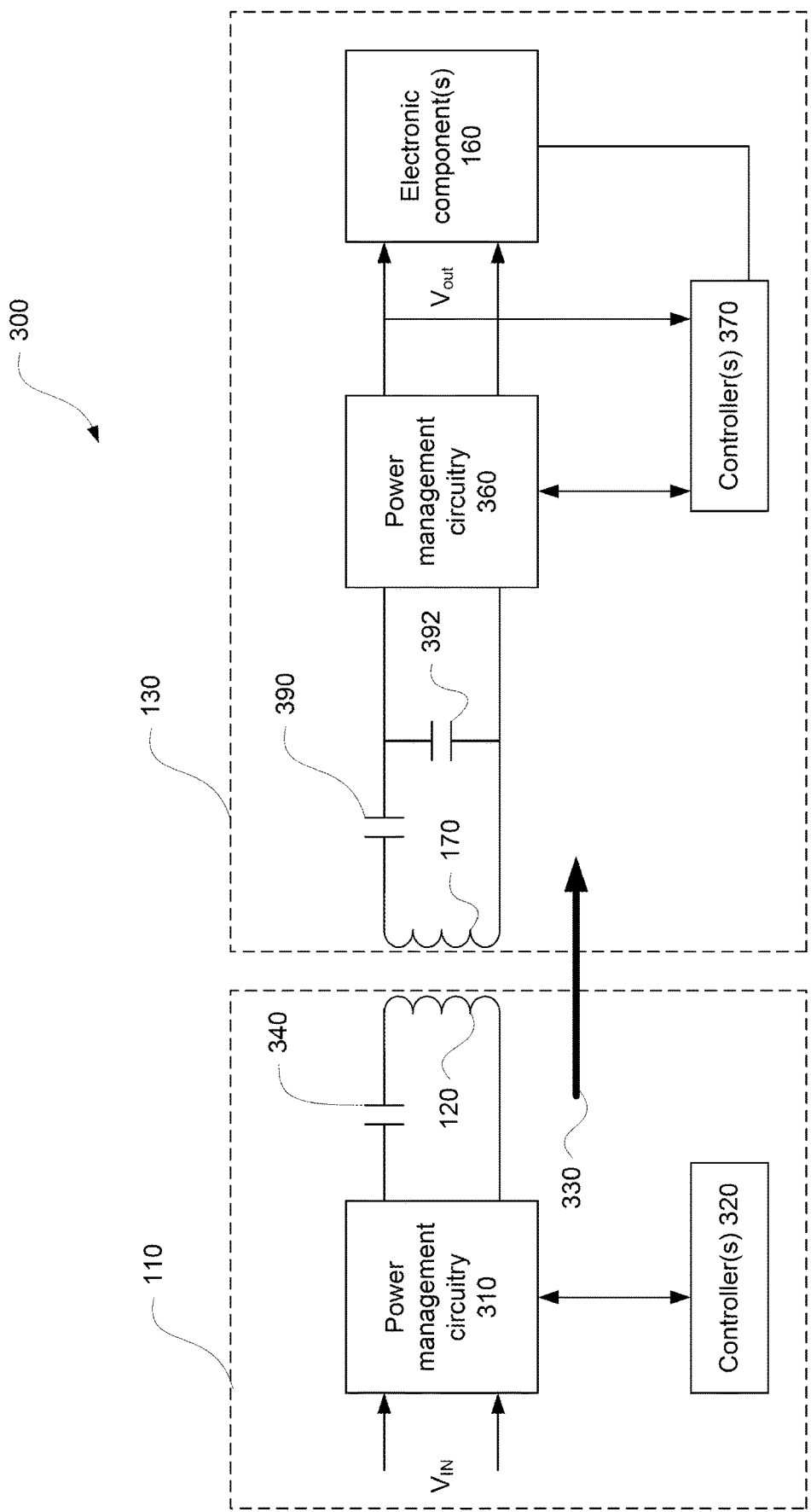
FIG. 3 is a circuit diagram illustrating an example wireless charging and communication system in accordance with aspects of the disclosure.

FIG. 3 shows an example wireless charging and communication system 300 for a wearable device, such as smartwatch 100 of FIG. 1. System 300 includes components from the body and the accessory of a wearable device. For example, the system 300 illustrates various components in the watch body 110 and various components in the watch band 130. In this example, system 300 is configured to both wirelessly transmit/receive power and communicate according to a Qi standard.

As shown, the watch body 110 includes power management circuitry 310 configured to enable wireless power transmission to the watch band 130. For example, the power management circuitry 310 may be an integrated circuit chip, such as a Power Management Integrated Circuit (PMIC). The power management circuitry 310 may be configured to receive incoming power at a certain voltage ($V_{in}$) from an energy source, such as a battery or a connection in the watch body 110 to a power outlet. For example, the power management circuitry 310 may receive a DC current from a battery of the watch body 110, and convert the DC current into an alternating current (AC) having an alternating electromagnetic field based on the Qi standard, resulting in power 330. Power 330 may then be transmitted as alternating electromagnetic field by the coil 120 of the watch body 110 (indicated by the bold arrow) to the watch band 130.

Further as shown, the watch band 130 also includes power management circuitry 360 configured to enable wireless power transmission from the watch body 110. In this regard, the power management circuitry 360 may also be an integrated circuitry chip such as a PMIC. For instance, transmitted power 330 in the form of alternating electromagnetic field from the charging coil 120 of the watch body 110 may be received by the charging coil 170 of the watch band 130, which may further transmit the received power to the power management circuitry 360. For example, the power management circuitry 360 may convert the received power 330 in the form of alternating electromagnetic field into a DC current having a certain voltage ($V_{out}$) required by electronic components of the watch band 130, such as electronic components 160 and one or more controllers 370. In some instances, the power management circuitry 360 may further determine whether the transmitted power 330 meets requirements of the watch band 130. For example, the power management circuitry 360 may compare a voltage of the transmitted power 330 to a threshold voltage, and determine whether the voltage of the transmitted power 330 is within a predetermined range of the threshold voltage.

To control various aspects of power transmission, the watch body 110 and the watch band 130 of the smartwatch 100 may each include one or more controllers, such as controllers 320 and controllers 370, respectively. Controllers 320 may be configured to communicate with power management circuitry 310 and with controllers 370 to manage power transmission. For example, controllers 320 may determine whether to initiate or stop power transmission to the watch band 130 based on any of a number of parameters, such as energy status of the watch body 110 and/or watch band 130, whether the watch body 110 and/or watch band 130 is currently being charged, whether the transmitted power 330 by the watch body 110 meets requirements of the watch band 130 such as a threshold voltage, etc. Likewise, controllers 370 may be configured to communicate with power management circuitry 360, and with controllers 320 to manage power reception. For example, controllers 370 may also determine whether to accept power transmission based on any of a number of parameters, such as energy status of the watch body 110 and/or watch band 130, whether the watch body 110 and/or watch band 130 is currently being charged, whether the transmitted power 330 received from the watch body 110 meets requirements of the watch band 130 such as a threshold voltage, etc.

Controllers 320 and 370 may each be configured to wirelessly transmit data to and/or receive data from each other to provide other functionalities. For instance, upon receiving a software update, controllers 320 may be configured to wirelessly transmit data relating to the software update in order to update software of controllers 370. This allows for over-the-air (OTA) updates while the smartwatch 100 is being worn and used by a user, without requiring the user to set the smartwatch 100 away just for installing software updates. As another example, controllers 320 may wirelessly send signals to controllers 370 to instruct electronic components 160 of the watch band 130 to generate outputs, such as haptic effects. Controllers 320 may also wirelessly receive data from controllers 370, such as sensor data measured by electronic components 160, which may include heart rate, body temperature, light/capacitance measurements indicating that the watch band 130 is being worn, etc. In this regard, controllers 370 may be configured to communicate with electronic components 160 as shown, and controllers 320 may be configured to communicate with electronic components of the watch body 110.

In this regard, the power management circuitry 310 may be configured to modulate the transmitted power to enable wireless communication between the watch body 110 and the watch band 130, such as from the controllers 320 of the watch body 110 to the controller 370 of the watch band 130. For instance, the power management circuitry 310 may be configured to adjust a frequency of the alternating magnetic field of the transmitted power 330 at the coil 120 to send data to the watch band 130. The modulation may produce a frequency modulated signal according to the Qi communication standard. This may be accomplished by an LC circuit or a tank circuit, such as by adjusting equivalent capacitance of the circuit. For example as shown, an LC circuit may be formed by the charging coil 120 to provide inductance and capacitor 340 to provide capacitance. Power 330, now modulated to carry data, may then be transmitted via the coil 120 to the coil 170 of the watch band 130.

Similarly, on the watch band 130 side, the power management circuitry 360 may be configured to modulate the received power to enable communication between the watch band 130 and the watch body 110, such as from the controllers 370 of the watch band 130 to the controllers 320 of the watch body 110. For example, the power management circuitry 360 may be configured to adjust an amplitude of the alternating magnetic field of the transmitted power 330 received by the coil 170 to send data to the watch body 110. The modulation may produce an amplitude modulated signal according to the Qi communication standard. This may also be accomplished by an LC circuit or a tank circuit, such as by adjusting equivalent capacitance of the circuit. For example as shown, an LC circuit may be formed by the charging coil 170 to provide inductance and capacitors 390 and 392 to provide capacitance. The charging coil 170 and the capacitor 390 may form the main LC tank circuit for power transfer, where capacitor 390 may remove DC components from the received power 330. An equivalent capacitance for the capacitor 392 may be adjusted to produce amplitude modulated signal. Power 330, now modulated to carry data, may then allow data to be transmitted from the watch band 130 to the watch body 110.

As such, the transmitted power 330 may carry data to be transmitted in both directions, from watch body 110 to watch band 130, and from watch band 130 to watch body 110. To avoid any conflict in this bi-directional transmission of data, the transmitted power 330 may be modulated by either the watch body 110 or the watch band 130, but not both, at any given time. The watch body 110 and watch band 130 may take turns transmitting data to each other according to any appropriate type of scheduling.

Figure 4A:
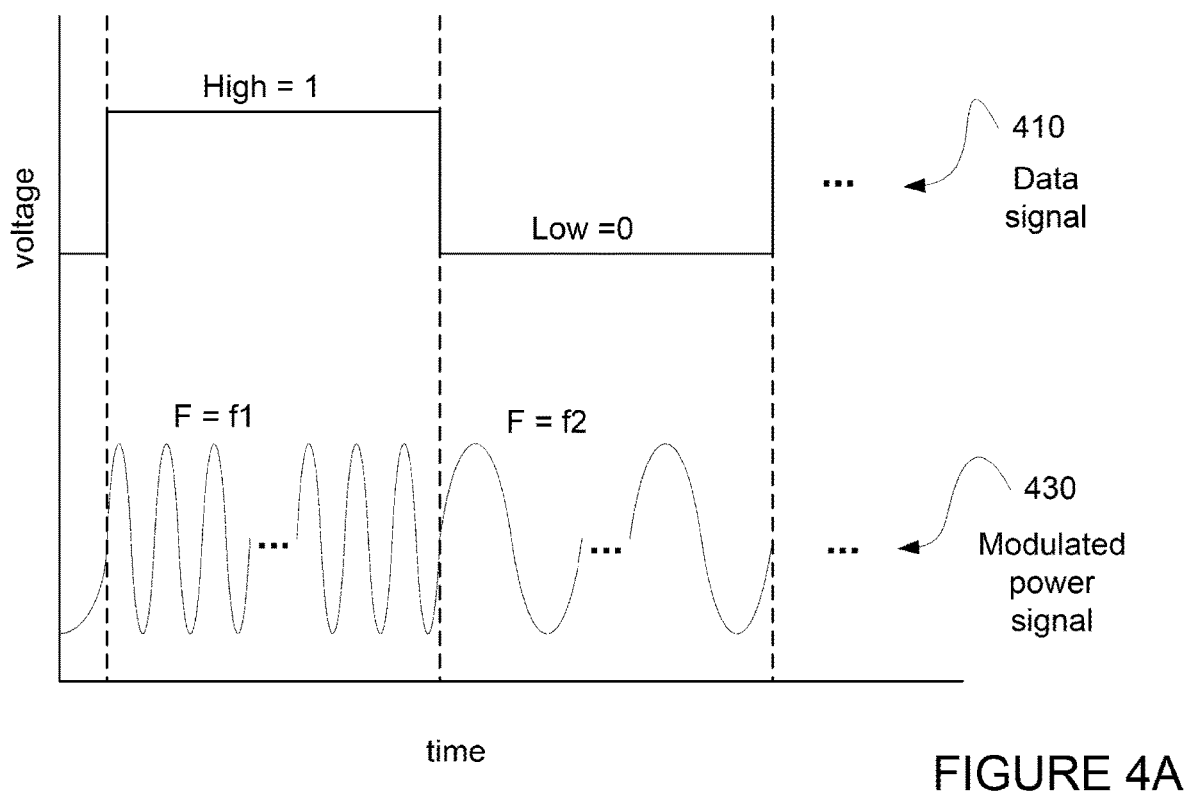
FIGS. 4A and 4B are example waveform diagrams illustrating frequency modulation and amplitude modulation in accordance with aspects of the disclosure.
Figure 4B:
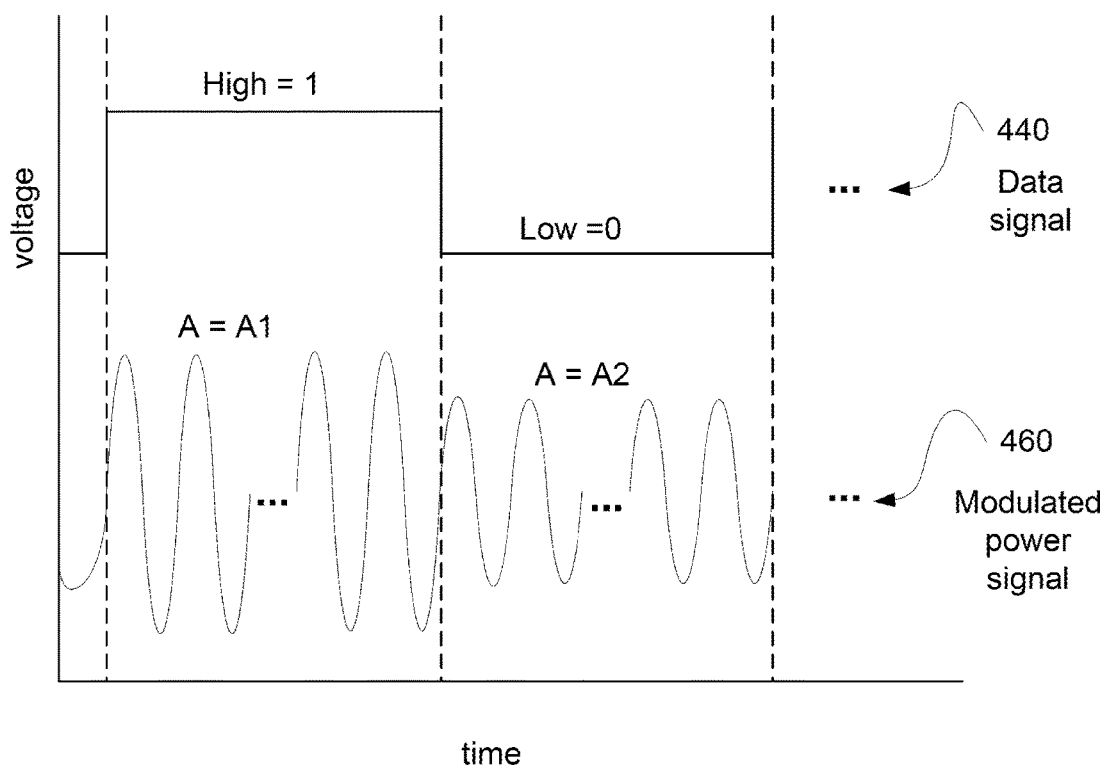

FIGS. 4A and 4B illustrate examples of frequency modulation and amplitude modulation, respectively. Aspects of FIGS. 4A and 4B may not be drawn to scale. FIG. 4A illustrates modulation by frequency-shift keying (FSK). For instance, controllers 320 of the watch body 110 of the smartwatch 100 may have data 410 to be transmitted to the watch band 130. The data 410 from controllers 320 may have a waveform, such as a square waveform as shown, where high signal is assigned logic "1" and low signal is assigned "0." This data 410 may be transmitted by modulating another signal. For instance, the signal may be the power 330 transmitted through charging coil 120, which may be an AC signal having a particular frequency "f0." To transmit data 410, the power signal 330 may be modulated by changing its frequency. For instance, the power signal 330 may be modulated with a first frequency "f1" when a high signal in data 410 is to be transmitted and modulated with a second frequency "f2" when a low signal in data 410 is to be transmitted, resulting in modulated signal 430. Further as shown by the modulated signal 430, in this example the first frequency f1 may be higher than the second frequency f2.

For ease and clarity of illustration, FIG. 4A shows a relatively large difference between f1 and f2. However, according to the Qi standard the difference between f1 and f2 may be much smaller. For instance, FIG. 4C shows a table 470 with example frequency differences for FSK according to a Qi standard. Referring to the table, the frequencies used for FSK can be adjusted between smaller modulation depths (smaller frequency difference) and larger modulation depths (larger frequency difference). Further, the frequencies used for FSK can have a negative or positive polarity depending on whether the higher frequency is keyed for a high signal or a low signal. For example, if the modulated power signal 430 in FIG. 4A is modulated with a negative modulation depth of 3, the frequencies may be f1=fop=145 kHz and f2=f mod=139 kHz respectively, which is a 6 kHz difference.

FIG. 4B illustrates modulation by amplitude-shift keying (ASK). For instance, controllers 370 of the watch band 130 of the smartwatch 100 may have data 440 to be transmitted to the watch body 110. The data 440 from controllers 370 may also have a waveform such as a square waveform. This data 440 may be transmitted by modulating another signal, such as the power 330 received through charging coil 170, which may be an AC signal having a particular amplitude "A0." To transmit data 440, the power signal 330 may be modulated by changing its amplitude. For instance, the power signal 330 may be modulated with a first amplitude "A1" when a high signal in data 440 is to be transmitted and modulated with a second amplitude "A2" when a low signal in data 440 is to be transmitted, resulting in modulated signal 460. Further as shown by the modulated signal 460, in this example the first amplitude A1 may be higher than the second amplitude A2.

As with FSK, the amplitudes used for ASK according to the Qi standard may also be adjusted between a small depth (small difference) and a large depth (large difference). The amplitudes used for ASK can also have either a negative or positive polarity depending on whether the higher amplitude is keyed for a high signal or a low signal.

FIGS. 4A and 4B thus illustrate an example of implementing bi-directional wireless communication between the watch body 110 and the watch band 130. By modulating the same power 330, data can both be sent from controllers 320 to controllers 370, as well as sent from controllers 370 to controllers 320. This is achieved by using two different types of modulations for the data transmitted in different directions. By using the same transmitted power and same wireless standard for both charging and communication, number of components may be reduced. For instance, one PMIC configured for Qi can be included in each of the watch body 110 and the watch band 130, without requiring additional PMICs or communication modules. Although in this example according to Qi standards, FSK is used for data transmitted from watch body 110 to watch band 130 and ASK is used for data transmitted from watch band 130 to watch body 110, in other examples according to other standards, ASK may be used for data transmitted from watch body 110 to watch band 130, and FSK may be used for data transmitted from watch band 130 to watch body 110. In still other examples, other types of modulation may alternatively or additionally be used.

Figure 5:
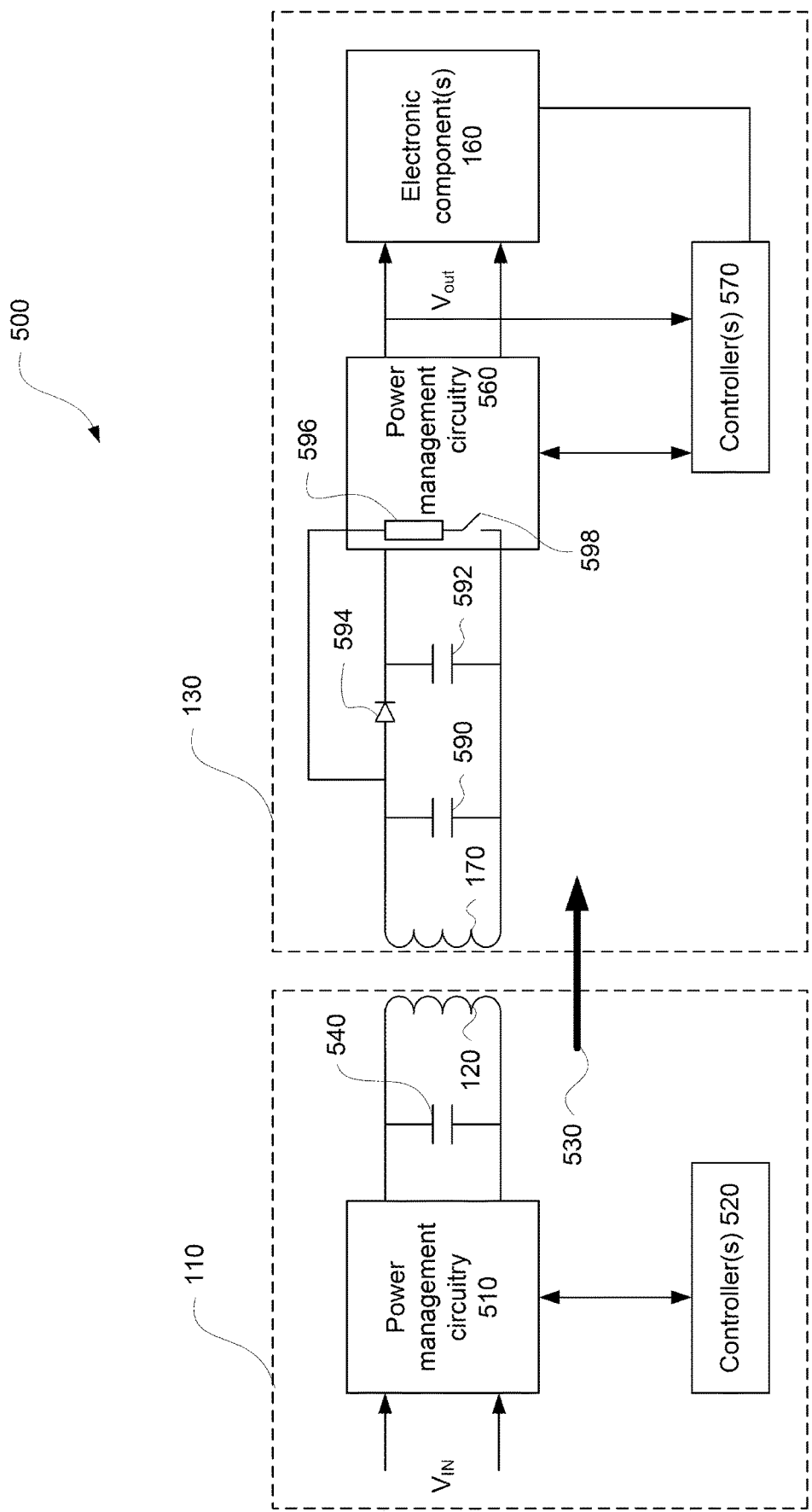
FIG. 5 is a circuit diagram illustrating another example wireless charging and communication system in accordance with aspects of the disclosure.

FIG. 5 shows another example wireless charging and communication system 500 for a wearable device, such as smartwatch 100 of FIG. 1. System 500 includes many similar features as FIG. 3, and are labeled as such. For instance, system 500 also includes components for watch body 110 and watch band 130, charging coil 120 and charging coil 170, and electronic components 160. Differences between system 300 and system 500 are described herein. For example, although power management circuitry 510, 560 and controllers 520, 570 may be configured similarly as power management circuitry 310, 360 and controllers 320, 370 respectively, here the power management circuitry 510, 560 and controllers 520, 570 may be configured to wirelessly transmit both power and communicate according to an NFC standard.

Power 530 transmitted according to the NFC standard may have different characteristics as the transmitted power 330 according to the Qi standard. For instance, voltage and/or current of transmitted power according to the NFC standard may be lower than the voltage and/or current of transmitted power according to the Qi standard. By way of example, amplitude of transmitted power according to the NFC standard may typically be 0.5 W-1 W, while the amplitude of transmitted power according to the Qi standard may typically be 5 W-15 W. As another example, frequency of transmitted power according to the NFC standard may typically be 13.56 MHz), while frequency of transmitted power according to the Qi standard may typically be 87 kHz-205 kHz.

Further, power 530 may also be modulated differently according to the NFC standard as compared to the Qi standard in order to transmit data. For instance, the power management circuitry 510 may be configured to adjust an amplitude of the alternating electromagnetic field of the power 530 transmitted through the coil 120 to send data to the watch band 130. The modulation may produce an amplitude modulated signal according to the NFC communication standard. This may be accomplished by an LC circuit or a tank circuit. For example as shown, an LC circuit may be formed by the charging coil 120 to provide inductance and capacitor 540 to provide capacitance. Further as shown in this example, the capacitors are in a parallel configuration. Power 530, now modulated to carry data, may then be transmitted via the coil 120 to the coil 170 of the watch band 130.

Similarly, on the watch band 130 side, the power management circuitry 560 may be configured to modulate the received power to enable communication between the watch band 130 and the watch body 110, such as from the controllers 570 of the watch band 130 to the controllers 520 of the watch body 110. For example, the power management circuitry 560 may be configured to adjust a load of the alternating electromagnetic field of the power 530 received through the coil 170 to send data to the watch body 110. The modulation may produce a load modulated signal according to the NFC communication standard. The modulation may produce additional loads at different frequencies, which are added to the power 530 according to the NFC communication standard. This may be accomplished by an LC circuit or a tank circuit. For example as shown, diode 594 and capacitor 592 may form a peak detection circuit to make AC to DC conversions, and also for determining the amplitude of the modulated signal received from the watch body 110 in order to decode the data carried by the modulated signal. Resistor 596 and switch 598 may be used for transmitting data from watch band 130 to watch body 110, where the switch 598 may be switched at a carrier frequency (for example, a frequency lower than the switching frequency of NFC at 13.56 MHz, such as 423 kHz). This load change may be detected on the watch body 110 by the power management circuitry 510, for example through charging coil 120 and capacitor 540.

Figure 6A:
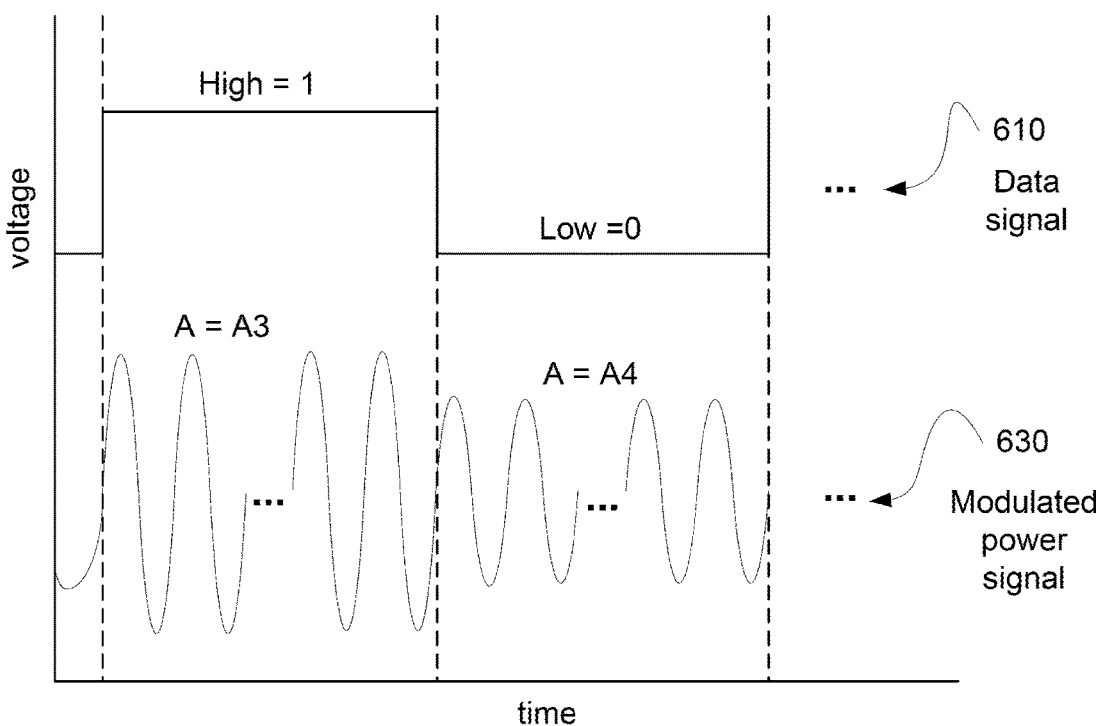
FIGS. 6A and 6B are example waveform diagrams illustrating amplitude modulation and load modulation in accordance with aspects of the disclosure.
Figure 6B:
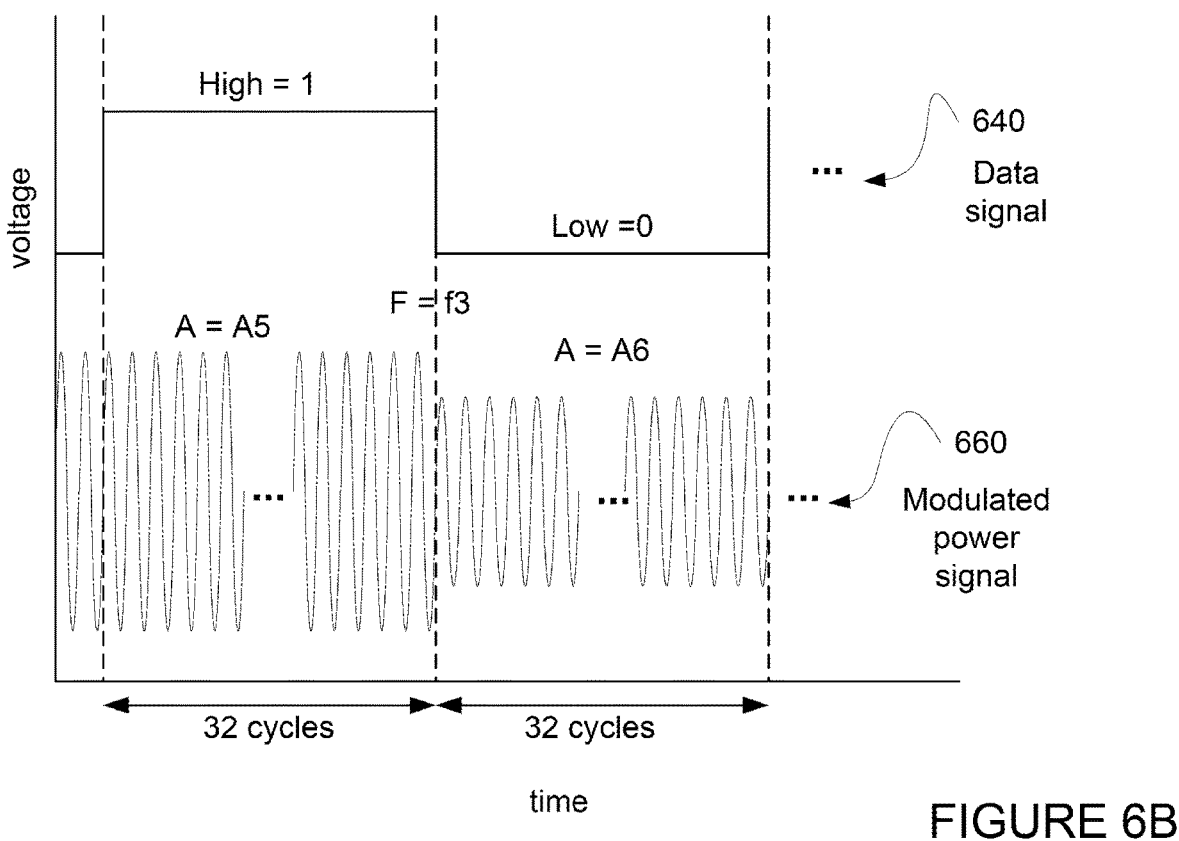

FIGS. 6A and 6B illustrate examples of amplitude modulation and load modulation, respectively. Aspects of FIGS. 6A and 6B may not be drawn to scale. FIGS. 6A and 6B thus illustrate another example way to enable bi-directional communication between the watch body 110 and the watch band 130. By modulating the same power signal 530, data can both be sent from controllers 520 to controllers 570, as well as sent from controllers 570 to controllers 520. However, in this example according to the NFC standard, ASK is used for data transmitted from watch body 110 to watch band 130 and load modulation is used for data transmitted from watch band 130 to watch body 110. In other examples according to other standards, load modulation may be used for data transmitted from watch body 110 to watch band 130, and ASK may be used for data transmitted from watch band 130 to watch body 110. In still other examples, other types of modulation may alternatively or additionally be used.

FIG. 6A illustrates ASK modulation, which is shown similar to the example modulation shown in FIG. 4B. For instance, data 610 may be transmitted by modulating amplitude A0' of power signal 530, resulting in modulated signal with amplitude A3 when transmitting high signal in data 610, and amplitude A4 when transmitting low signal in data 610. However, in this example, data 610 is amplitude modulated signal transmitted from the watch body 110 to watch band 130.

FIG. 6B illustrates load modulation, which as shown is different from both ASK and FSK described above. For instance, to transmit data 640 from controllers 570 of the watch band 130 to the watch body 110, power signal 530, which may have a particular frequency f0' and particular amplitude A0', may be modulated. The power signal 530 may be modulated by adding a load signal having a load frequency f3 different than the frequency f0' of transmitted power and a first load amplitude A5 when a high signal in data 640 is to be transmitted, and a second amplitude A6 when a low signal in data 640 is to be transmitted. Further as shown by the modulated power signal 660, the load frequency f3 (e.g. 13.45 MHz) may be higher than the frequency f0' (e.g. 423 kHz). A5 and A6 may be the same or different from A3 and A4, respectively.

Figure 7:
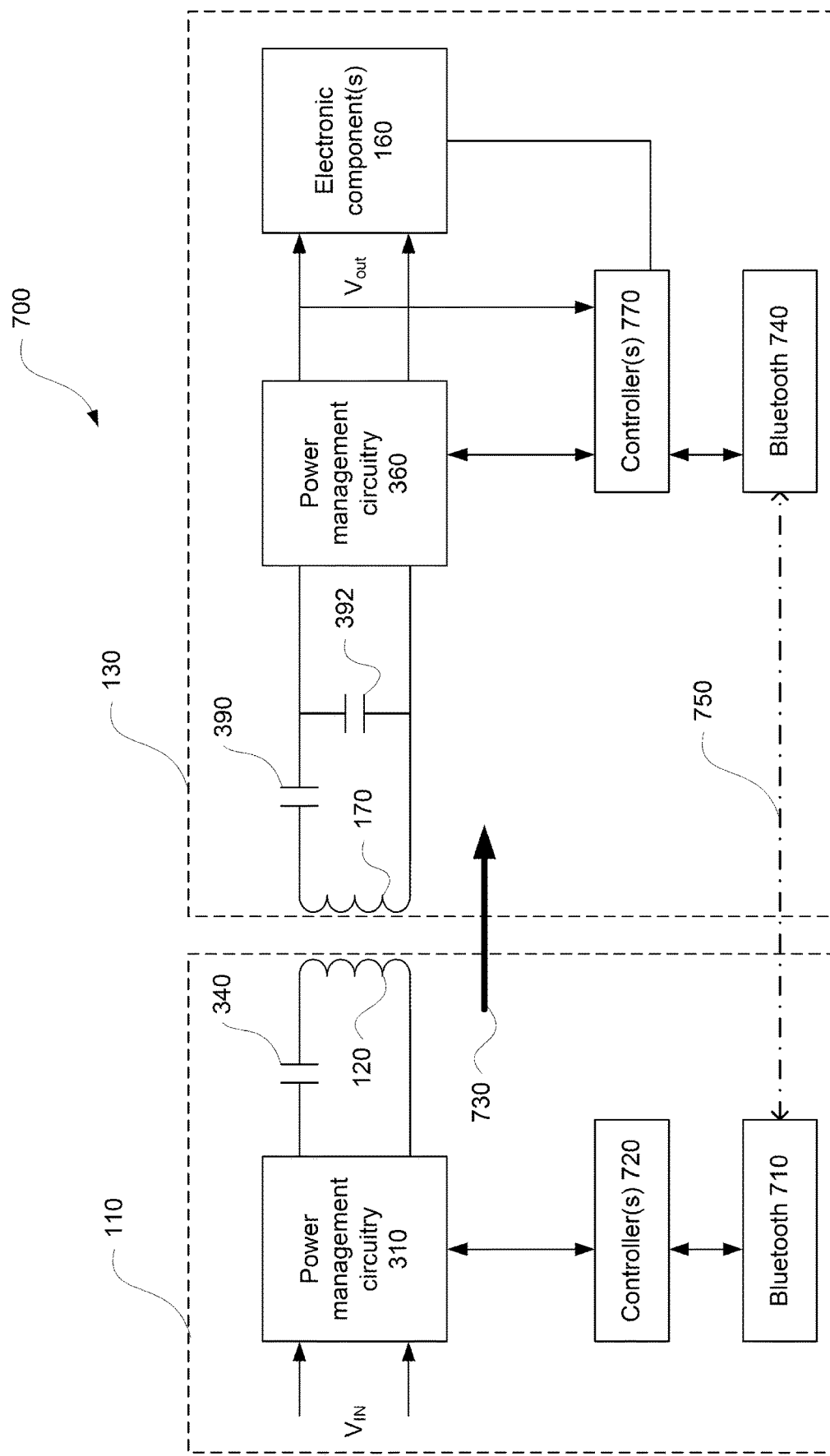
FIG. 7 is a circuit diagram illustrating another example wireless charging and communication system in accordance with aspects of the disclosure.
Figure 8:
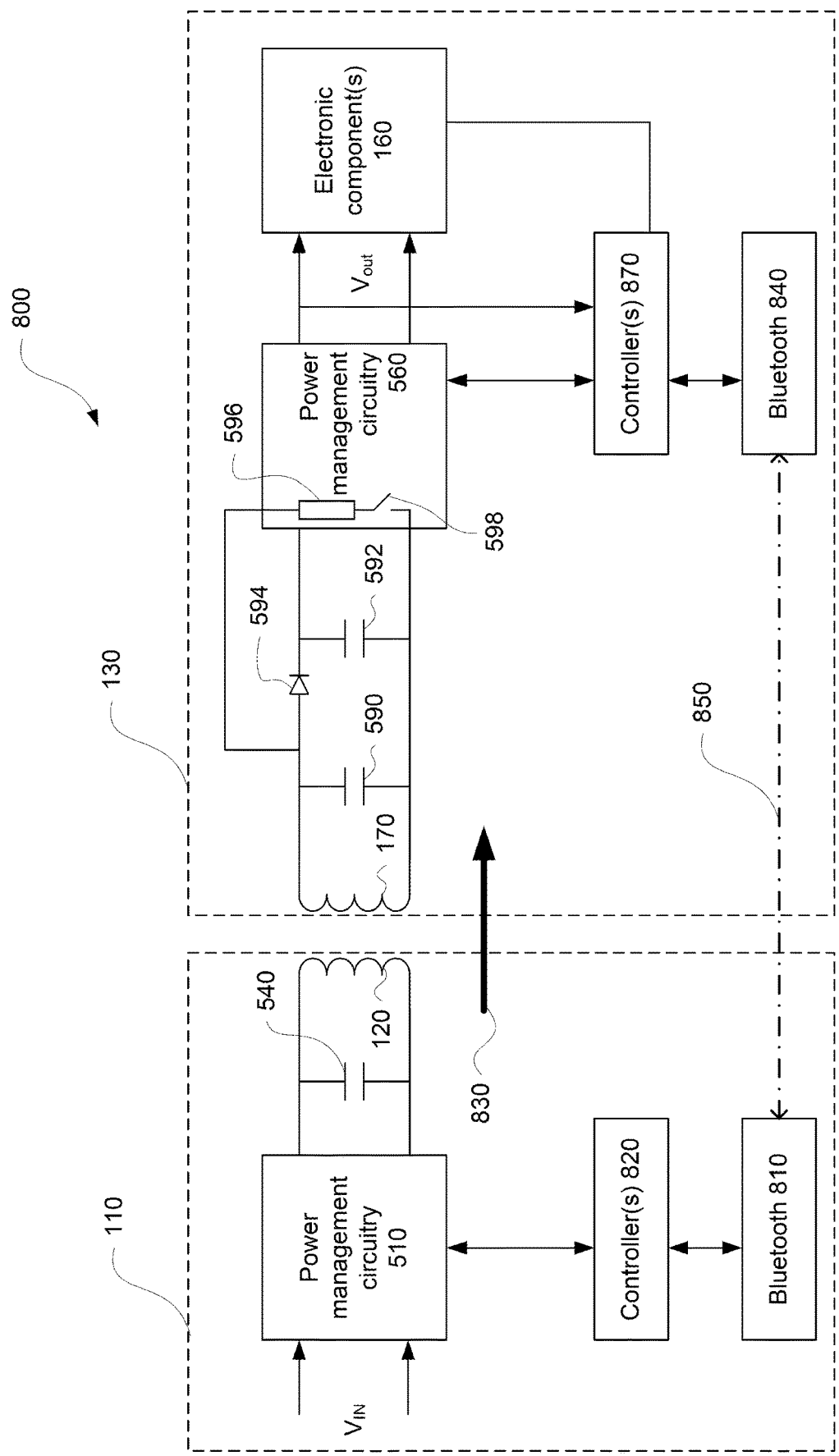
FIG. 8 is a circuit diagram illustrating another example wireless charging and communication system in accordance with aspects of the disclosure.

Although the examples in FIGS. 3 and 5 use one standard for both wireless power transmission and wireless data transmission, in other examples, different standards may be used for wireless power transmission and wireless data transmission. For instance, wireless power transmission may be using a protocol that allows higher level of power to be transmitted, while wireless data transmission may be using a protocol that allows larger volumes of data to be transmitted. For example, Qi and NFC standards may allow a higher amount of power to be transmitted, which may be on the order of hundreds milliwatts, than Bluetooth standards, which may be on the order of up to tens of mW. On the other hand, Bluetooth standards may allow a higher volume of data to be transmitted, such as on the order of megabits/second, than Qi and NFC standards, which may be on the order of hundreds of bits/second. As such, a wireless charging and communication system may be designed using a combination of two or more standards to increase efficiency of power and/or data transfer. FIGS. 7 and 8 each illustrates an example system in which two types of signals are used for wireless power transmission and wireless data transmission.

For instance, FIG. 7 shows an example wireless charging and communication system 700 for a wearable device, such as smartwatch 100 of FIG. 1. System 700 includes many similar features as FIG. 3, and are labeled as such. For instance, system 700 also includes components for watch body 110 and watch band 130, charging coil 120 and charging coil 170, electronic components 160, and power management circuitry 310, 360 configured for transmitting power using a Qi standard. Differences between system 300 and system 700 are described herein.

For instance, although controllers 720, 770 may be configured similarly as controllers 320, 370, respectively, here the controllers 720, 770 may be configured to communicate using a Bluetooth standard. Power 730 may still be transmitted from watch body 110 and watch band 130, however, power 730 is not modulated to transmit data. Rather, data 750 is transmitted between a Bluetooth communication module 710 in the watch body 110 and a Bluetooth communication module 740 in the watch band 130. As examples, the Bluetooth communication modules 710 and 740 may each be Bluetooth chipsets. Further as shown, Bluetooth communication modules 710 and 740 may be configured for bi-directional communication.

FIG. 8 shows another example wireless charging and communication system 800 for a wearable device, such as smartwatch 100 of FIG. 1. System 800 includes many similar features as FIG. 5, and are labeled as such. For instance, system 800 also includes components for watch body 110 and watch band 130, charging coil 120 and charging coil 170, electronic components 160, and power management circuitry 510, 560 configured for transmitting power using an NFC standard. However, although controllers 820, 870 may be configured similarly as controllers 520, 570, respectively, here the controllers 820, 870 may be configured to communicate using a Bluetooth standard, similar to the example in FIG. 7. For instance, power 830 may be transmitted from watch body 110 and watch band 130 without being modulated, and data 850 is transmitted between a Bluetooth communication module 810 in the watch body 110 and a Bluetooth communication module 840 in the watch band 130. Further as shown, Bluetooth communication modules 810 and 840 may be configured for bi-directional communication.

Although FIGS. 7 and 8 each illustrates an example system in which Bluetooth signal is used for wireless data transmission, and another standard is used for wireless power transmission, other combinations may be possible. For example, Qi standard may be used for wireless power transmission, while NFC standard may be used for wireless data transmission, or vice versa. Further, although the examples in FIGS. 3, 5, 7, and 8 illustrate wireless power transmission and wireless data transmission using Qi, NFC, or Bluetooth standards, in other examples, different standards, such as Airfuel-A4WP protocol, may be used for wireless power transmission and wireless data transmission.

Figure 9:
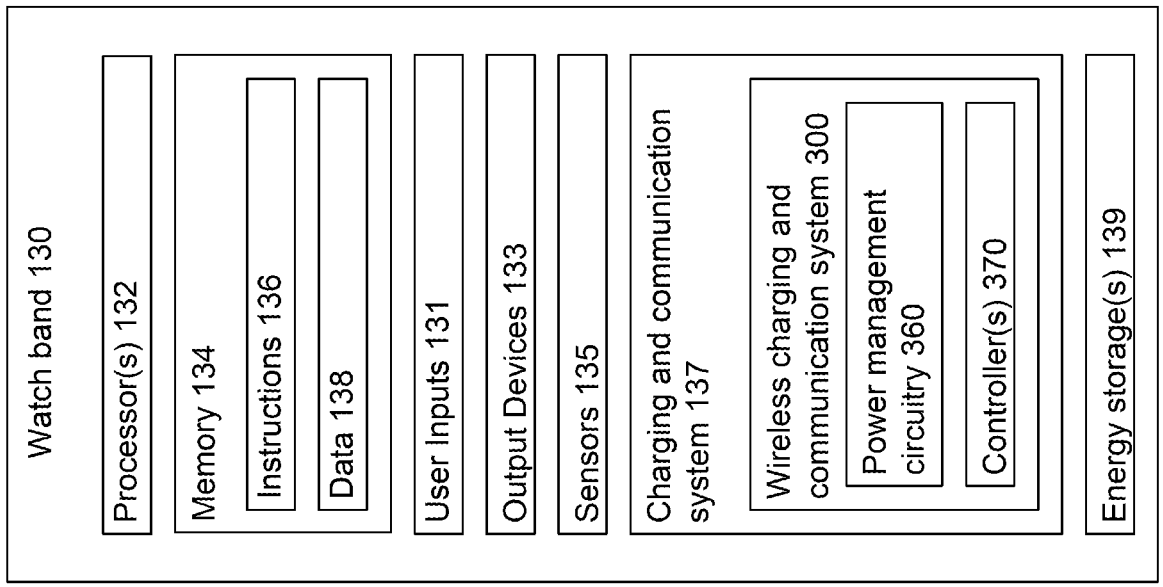
FIG. 9 is a block diagram of an example system in accordance with aspects of the disclosure.
Figure 9:
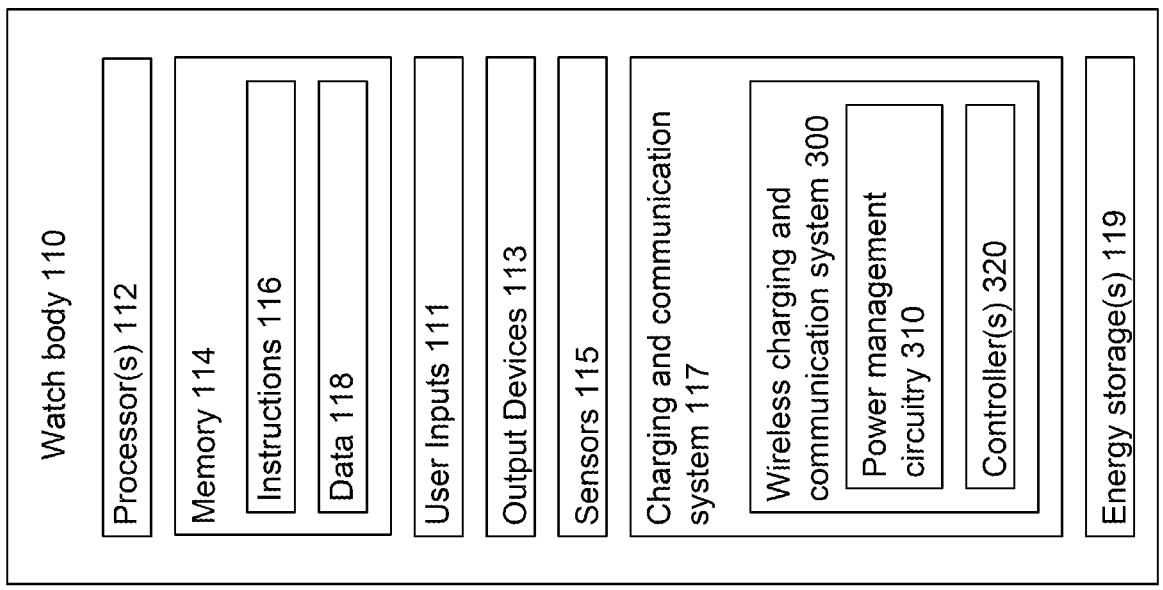

FIG. 9 is a functional block diagram of a wearable device in which the features described herein may be implemented. For instance, the wearable device may be the smartwatch 100 including the watch body 110 and the watch band 130. It should not be considered as limiting the scope of the disclosure or usefulness of the features described herein. For example as shown, the watch body 110 may contain one or more processors 112, memory 114 and other components typically present in general purpose computing devices, and the watch band 130 may similarly contain one or more processors 132, memory 134 and other components typically present in general purpose computing devices.

Memories 114, 134 can store information accessible by the one or more processors 112, 132, including instructions 116, 136, that can be executed by the one or more processors 112, 132. Memories 114, 134 can also include data 118, 138 that can be retrieved, manipulated or stored by the processors 112, 132. The memories can be of any non-transitory type capable of storing information accessible by the processor, such as a hard-drive, memory card, ROM, RAM, DVD, CD-ROM, write-capable, and read-only memories.

The instructions 116, 136 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118, 138 can be retrieved, stored or modified by the one or more processors 112, 132 in accordance with the instructions 116, 136. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112, 132 can be any conventional processors, such as a commercially available CPU. Alternatively, the processors can be dedicated components such as an application specific integrated circuit ("ASIC") or other hardware-based processor. Although not necessary, the watch body 110 and/or the watch band 130 may include specialized hardware components to perform specific computing processes, such as decoding video, matching video frames with images, distorting videos, encoding distorted videos, etc. faster or more efficiently. As examples, the one or more processors 112 may include controllers 320 of FIG. 3, controllers 520 of FIG. 5, controllers 720 of FIG. 7, or controllers 820 of FIG. 8. Similarly, the one or more processors 132 may include controllers 370 of FIG. 3, controllers 570 of FIG. 5, controllers 770 of FIG. 7, or controllers 870 of FIG. 8.

Although FIG. 9 functionally illustrates the processor, memory, and other elements of the watch body 110 and watch band 130 as being within the same block, the processor, computer, computing device, or memory can actually comprise multiple processors, computers, computing devices, or memories that may or may not be stored within the same physical housing. For example, the memory can be a hard drive or other storage media located in housings different from that of the watch body 110 and/or watch band 130. Accordingly, references to a processor, computer, computing device, or memory will be understood to include references to a collection of processors, computers, computing devices, or memories that may or may not operate in parallel.

Further as shown in FIG. 9, the watch body 110 and watch band 130 may include one or more user inputs, such as user inputs 111, 131 respectively. For instance, user inputs may include mechanical actuators, soft actuators, periphery devices, sensors, and/or other components. Users may be able to interact with the smartwatch 100 using the user inputs 111, 131, such as opening a webpage or an email, writing a message, controlling display or audio functionalities, controlling sensors to monitor heart rate or body temperature, locating by GPS, etc.

The watch body 110 and watch band 130 may include one or more output devices, such as output devices 113, 133 respectively. For instance, output devices may include one or more speakers, transducers or other audio outputs, a user display, a haptic interface or other tactile feedback that provides non-visual and non-audible information to the user. For example, a display in output devices 113, 133 may display visual information to the user, such as texts, graphics, videos, etc. As another example, speakers in output devices 113, 133 may be used to play music, emit audio for navigational or other guidance, for multimedia files, for voice calls, for translated speech, etc. Further, haptic or tactile feedback in the output devices 113, 133 may be used to generate non-visual and non-audible alerts, such as by vibration. In some instances, haptics or tactile feedback may be included in output device 133 of the watch band 130, which may be in closer contact with the user when being worn than the watch body 110, and thus may be more effective.

The watch body 110 and watch band 130 may include one or more sensors, such as sensors 115, 135 respectively. For instance, sensors may include a visual sensor, an audio sensor, a touch sensor, etc. Sensors may also include motion sensors, such as an Inertial Measurement unit ("IMU"). According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, a barometric pressure sensor, a heart rate sensor, a body temperature sensor. Additional or different sensors may also be employed. In some instances, sensors that measure physiological states of a user, such as heart rate sensor or body temperature sensor, may be included in sensors 135 of the watch band 130, which may be in closer contact with the user when being worn than the watch body 110, and thus may generate more accurate measurements. As another example, sensors that detect whether the smartwatch 100 is being worn, such as IR or capacitive sensors, may also be included in sensors 135 of the watch band 130, which may also generate more accurate detection due to proximity to the user.

In order to obtain information from and send information to each other, as well as to other remote devices, watch body 110 and watch band 130 may each include a communication system. The communication systems may be part of charging and communication systems 117, 137 respectively. In this regard, the charging and communication systems 117, 137 may each include wireless charging and communication systems 300, 500, 700, or 800. In the example shown, the charging and communication systems 117, 137 include wireless charging and communication system 300 with the power management circuitry 310, 360 configured to modulate power signals to transmit data, and controllers 320, 370 that control transmitting and/or receiving data based on Qi standard. Although shown as separate, the controllers 320, 370 may be part of processors 112, 132 respectively. In other examples, the charging and communication systems 117, 137 may alternatively include power management circuitry 510, 560 and controllers 520, 570 configured to transmit and/or receive data according to the NFC standard, or alternatively controllers 720, 770 and Bluetooth communication modules 710, 740 configured to transmit and/or receive data according to Bluetooth standard, etc.

Using the communication systems, watch body 110 and watch band 130 may communicate with each other, and/or with other devices (not shown). The communication systems may enable wireless network connections, wireless ad hoc connections, and/or wired connections. Via the communication systems, the watch body 110 and watch band 130 may establish communication links, such as wireless links. The communication systems may be configured to support communication via cellular, LTE, 4G, WiFi, GPS, and other networked architectures. The communication systems may be configured to support Bluetooth®, Bluetooth LE, near field communication (NFC) standards, Qi standards, and non-networked wireless arrangements. The communication systems may support wired connections such as a USB, micro USB, USB type C or other connector, for example to receive data and/or power from a laptop, tablet, smartphone or other device.

In order to receive and/or transmit power, watch body 110 and watch band 130 may each include a charging system. The charging systems may be part of the charging and communication systems 117, 137 respectively. In this regard, the charging and communication systems 117, 137 may each include wireless charging and communication systems 300, 500, 700, or 800. The charging and communication systems 117, 137 may each include one or more energy storages, such as energy storages 119, 139. In the example shown, the charging and communication systems 117, 137 include wireless charging and communication system 300 with the power management circuitry 310, 360 configured to transmit and/or receive power inductively, and controllers 320, 370 that control transmitting and/or receiving based on the Qi standard, as well as based other parameters such as battery or charging status. Although shown as separate, the controllers 320, 370 may be part of processors 112, 132 respectively. In other examples, the charging and communication systems 117, 137 may alternatively include power management circuitry 510, 560 and controllers 520, 570 configured to transmit and/or receive power according to NFC standard, etc.

Although not shown, the watch body 110 and/or watch band 130 may also include other additional components. For instance, the watch body 110 and/or watch band 130 may include a position determination module, which may include a GPS chipset or other positioning system components. Information from the sensors and/or from data received or determined from remote devices (e.g., wireless base stations or wireless access points), can be employed by the position determination module to calculate or otherwise estimate the physical location of the watch body 110 and/or watch band 130. As another example, the watch body 110 and/or watch band 130 may each include one or more internal clocks. The internal clocks may provide timing information, which can be used for time measurement for apps and other programs run by the computing devices, and basic operations by the computing devices, sensors, inputs/outputs, GPS, communication system, etc.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 10:
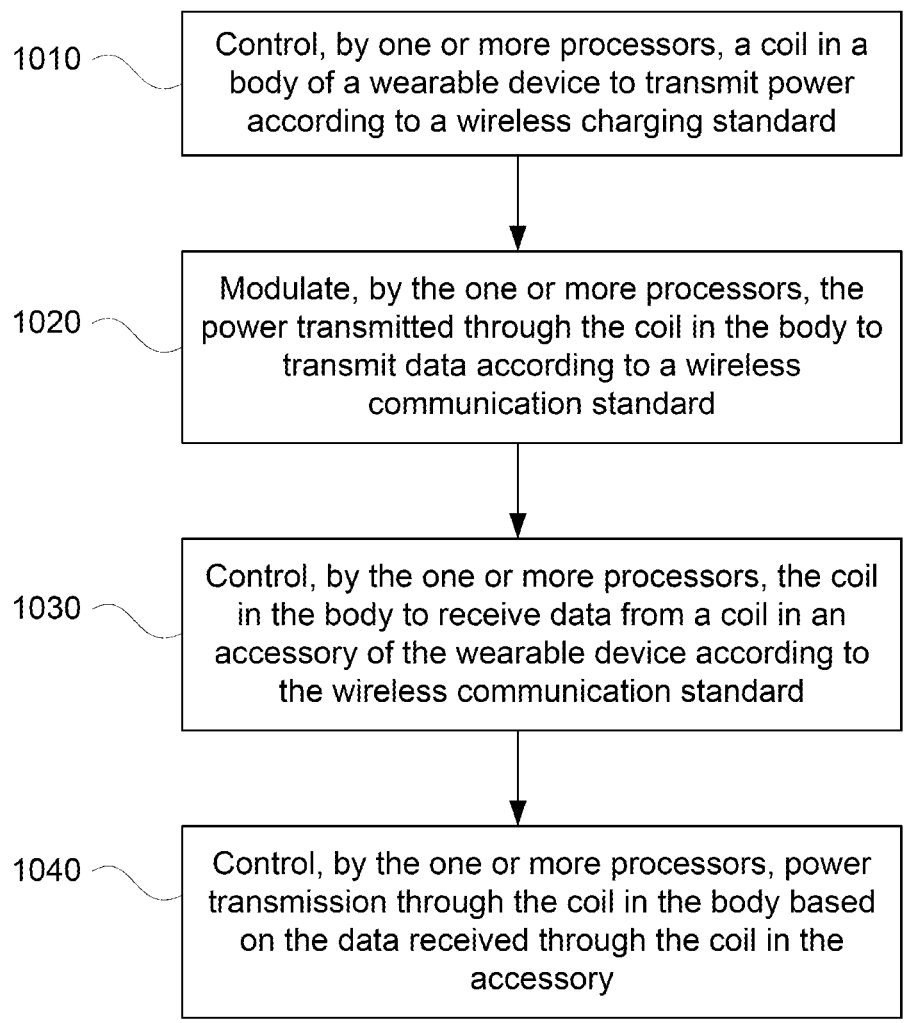
FIG. 10 is an example flow diagram in accordance with aspects of the disclosure.

FIG. 10 shows an example flow diagram that may be performed by a wearable device, such as the smartwatch 100. In particular, the flow diagram may be performed by a body of the wearable device, such as watch body 110 of the smartwatch 100. For example, components of wireless charging and communication system 300 or 500 in the watch body 110, such as one or more processors in controllers 320 or 520 may be configured perform the flow diagram of FIG. 10.

Referring to FIG. 10, in block 1010, a coil in a body of a wearable device may be controlled by one or more processors to transmit power according to a wireless charging standard. For example, controllers 320 or 520 may control power management circuitry 310 or 510 respectively, which may in turn control the coil 120 to transmit power according to a Qi standard as shown in FIG. 3, or according to an NFC standard as shown in FIG. 5.

In block 1020, the power transmitted through the coil in the body is modulated by one or more processors to transmit data according to a wireless communication standard. For example, controllers 320 or 520 may control power management circuitry 310 or 510 respectively, which may in turn modulate the power transmitted through coil 120 to transmit data according to a Qi standard as shown in FIG. 3, or according to an NFC standard as shown in FIG. 5. As described above with respect to example systems, the data may include energy status of the watch body 110, charging status of the watch body 110, instructions for electronic components 160 in the watch band 130, etc.

In block 1030, the coil in the body is controlled by one or more processors to receive data from a coil in an accessory of the wearable device according to the wireless communication standard. For example, controllers 320 or 520 may control power management circuitry 310 or 510 respectively, which may in turn control the coil 120 to receive data according to a Qi standard as shown in FIG. 3, or according to an NFC standard as shown in FIG. 5. As described above with respect to example systems, the data may include energy status of the watch band 130, charging status of the watch band 130, sensor data such as heart rate, body temperature, IR/capacitive sensor data measured by electronic components 160 in the watch band 130, identification/authentication information from RFID devices in the watch band 130, etc.

In block 1040, power transmission through the coil in the body is controlled based on the data received through the coil in the accessory. For example, controllers 320 or 520 may determine to charge the watch band 130 only when data received from the watch band 130 indicate that the smartwatch 100 is being worn, thus may avoid wastefully charging watch band 130 when not being used. As another example, controllers 320 or 52 may determine not to charge the watch band 130 when data received from the watch band 130 indicate that a battery of the watch band 130 has charges meeting a predetermined threshold, thus may avoid wastefully charging watch band 130 when not needed. As still another example, controllers 320 or 520 may determine not to charge the watch band 130 when data received from the watch band 130, such as an error message, indicating that the transmitted power does not meet requirements of the watch band 130 such as not meeting a threshold voltage.

Figure 11:
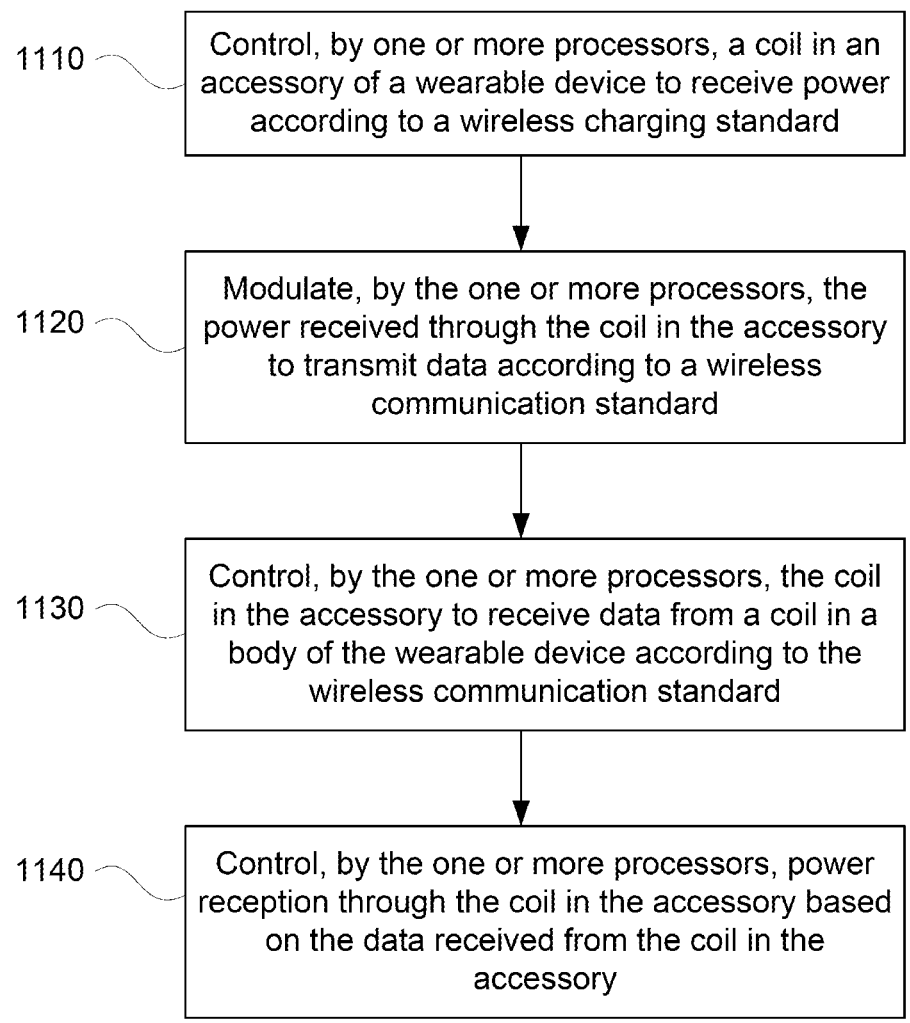
FIG. 11 is another example flow diagram in accordance with aspects of the disclosure.

FIG. 11 shows another example flow diagram that may be performed by a wearable device, such as the smartwatch 100. In particular, the flow diagram may be performed by an accessory of the wearable device, such as watch band 130 of the smartwatch 100. For example, components of wireless charging and communication system 300 or 500 in the watch band 130 may receive and/or transmit power and data wirelessly according to the flow diagram of FIG. 11.

Referring to FIG. 11, in block 1110, a coil in an accessory of a wearable device may be controlled by one or more processors to receive power according to a wireless charging standard. For example, controllers 370 or 570 may control power management circuitry 360 or 560 respectively, which may in turn control the coil 170 to receive power according to a Qi standard as shown in FIG. 3, or according to an NFC standard as shown in FIG. 5.

In block 1120, the power received through the coil in the accessory is modulated by one or more processors to transmit data according to a wireless communication standard. For example, controllers 370 or 570 may control power management circuitry 360 or 560 respectively, which may in turn modulate the power received through coil 170 to transmit data according to a Qi standard as shown in FIG. 3, or according to an NFC standard as shown in FIG. 5. As described above with respect to example systems, the data may include energy status of the watch band 130, charging status of the watch band 130 such as whether power received from the watch body 110 meet requirements of the watch band 130 such as not meeting a threshold voltage, sensor data measured by electronic components 160 in the watch band 130, identification/authentication information from RFID devices, etc.

In block 1130, the coil in the accessory is controlled by one or more processors to receive data from a coil in the accessory of the wearable device according to the wireless communication standard. For example, controllers 370 or 570 may control power management circuitry 360 or 560 respectively, which may in turn control the coil 170 to receive data according to a Qi standard as shown in FIG. 3, or according to an NFC standard as shown in FIG. 5. As described above with respect to example systems, the data may include energy status of the watch body 110, charging status of the watch body 110, instructions for electronic components 160 of the watch band 130, etc.

In block 1140, power reception through the coil in the accessory is controlled based on the data received through the coil in the accessory. For example, controllers 370 or 570 may determine to accept power from the watch body 110 only when data received from the watch body 110 indicate that charges in a battery in the watch body 110 does not fall below a predetermined threshold, thereby avoiding depleting the watch body 110 of power. As another example, controllers 370 or 570 may determine not to charge the watch body 110 when data received from the watch band 130 indicate that the watch body 110 is currently being charged by a charger, thus avoid slowing down charging of the watch body 110.

Although FIGS. 10 and 11 show example operations by a wearable device, alternative or additional operations may be possible. For example, the smartwatch 100 having wireless charging and communication system 700 or 800 may perform similar wireless charging and communication as FIGS. 10 and 11, but the communication may be performed according to a Bluetooth standard. Further, data transmitted between body and accessory of a wearable device may be used for other purposes in addition to managing wireless charging. For example as described above with respect to example systems, identification/authentication data may be transmitted between the watch body 110 and the watch band 130 for customization and/or security purposes. Sensor data and control signals may be transmitted between the watch body 110 and watch band 130 for generating output to a user. For example, heart rate measured by electronic components 160 of the watch band 130 may be transmitted to watch body 110 to be displayed. As another example, control signal may be sent from watch body 110 to watch band 130 to generate a haptic output, such as a vibration to alert a user.

The technology is advantageous because it provides bi-directional wireless charging and communication capabilities between a body and accessory of a wireless device. Wireless charging and communication allow more functionalities to be incorporated into a wearable device without adding significant weight or volume, for example by including the additional components in the accessory without adding batteries in the accessory, since the accessory may be wirelessly charged. Wireless charging and communication may reduce or eliminate the need for electrical connections between the body and a modular accessory of a wearable device, which may improve water-proof or water-resistant capabilities. Wireless communication between the body and the accessory of a wearable device may allow smart and efficient charging based on various statuses of the body and/or the accessory as described herein. Over the air (OTA) software updates may also be performed by wireless communication, which may provide further convenience to users as the wearable device may be updated while being worn or used. Further, wireless communication between the body and modular accessories of a wearable device may provide easy customization and security options by linking user profiles with Radiofrequency Identifications (RFID) in the modular accessories.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
    a body adapted to be attached to an accessory, wherein the body includes:
        a first coil configured to:
            receive power from a charger;
            inductively transmit the power to the accessory; and
            receive data from a second coil; and
        one or more first controllers; and
    the accessory, wherein the body and the accessory are configured to be worn by a user, wherein the accessory includes the second coil configured to inductively receive the power from the first coil or the charger,
    wherein the one or more first controllers are configured to:
        determine whether the data received through the first coil indicates that the body and the accessory are being worn; and
        control the first coil to stop transmission of power when the data received through the first coil indicates that the body and the accessory are not being worn.

2. The system of claim 1, wherein the body further includes first power management circuitry configured to control the power transmitted through the first coil and modulate the power transmitted through the first coil.

3. The system of claim 1, wherein the body further includes one or more first controllers configured to:
    determine whether the data received through the first coil indicate that the power transmitted through the first coil meets a threshold voltage of the accessory; and
    control the first coil to stop transmission of power when the data received through the first coil indicates that the power transmitted through the first coil does not meet the threshold voltage of the accessory.

4. The system of claim 1, wherein the accessory further includes power management circuitry configured to control the second coil to receive data transmitted through the first coil.

5. The system of claim 4, wherein the power management circuitry is further configured to modulate the power received through the second coil to transmit data.

6. The system of claim 5, wherein the power management circuitry is configured to modulate the power received through the second coil by one of: Amplitude-Shift Key (ASK) or load modulation.

7. A system, comprising:
    a body adapted to be attached to an accessory, wherein the body includes:
        a first coil configured to receive power from a charger and to inductively transmit the power to the accessory; and the accessory, wherein the accessory includes:
- a second coil configured to inductively receive the power from the first coil or the charger, and
- one or more second controllers configured to:
  - determine whether data received through the second coil indicate that the first coil is being charged by the charger; and
  - control the second coil to stop receiving the power transmitted through the first coil or the charger when the data received through the second coil indicates that the first coil is being charged by the charger.

8. The system of claim 5,
wherein the power management circuitry is further configured to compare a voltage of the received power with a threshold voltage; and
wherein the accessory further includes one or more second controllers configured to generate the data to be transmitted through the second coil based on the comparison between the voltage of the received power and the threshold voltage.

9. The system of claim 5, further comprising:
one or more sensors configured to generate data indicating whether the wearable device is being worn;
wherein the accessory further includes one or more second controllers configured to:
  determine whether the data from the one or more sensors indicate that the body and the accessary are being worn; and
  control the second coil to stop receiving power based on a determination that the wearable device is not being worn.

10. The system of claim 4, wherein the power management circuitry is further configured to control the second coil to transmit power.

11. The system of claim 1, wherein the power is transmitted and received according to a standard.

12. A wearable device, comprising:
a body adapted to be attached to an accessory, wherein the body includes:
  a first coil configured to:
    receive power from a charger;
    inductively transmit the power to the accessory; and
    receive data from a second coil; and
  one or more first controllers; and
the accessory, wherein the body and the accessory are configured to be worn by a user, wherein the accessory includes the second coil configured to inductively receive the power from the first coil or the charger,
wherein the one or more first controllers are configured to:
  determine whether the data received through the first coil indicates that the body and the accessory are being worn; and
  control the first coil to stop transmission of power when the data received through the first coil indicates that the body and the accessory are not being worn.

13. The wearable device of claim 12, wherein the body further includes first power management circuitry configured to control the power transmitted through the first coil and modulate the power transmitted through the first coil.

14. A method, comprising:
controlling, by one or more processors, power received by a coil in a body of a wearable device from a charger and the power transmitted through the coil to an accessory,
  wherein the body of the wearable device is adapted to be attached to the accessory, and
  wherein the body and the accessory are configured to be worn by a user;
controlling, by the one or more processors, power transmission through the coil in the body based on data received through a coil in the accessory;
determining, by the one or more processors, whether data received through the coil in the body indicates that the body and the accessory is being worn; and
controlling, by the one or more processors, the coil in the body to stop transmission of power when the data received through the coil in the body indicates that the body and the accessory are not being worn.

15. The method of claim 14, further comprising:
controlling, by the one or more processors, the power transmitted through the coil in the body; and
modulating, by the one or more processors, the power transmitted through the coil in the body.

16. The method of claim 14, further comprising receiving, by the coil in the body, data from the coil in the accessory.

17. The method of claim 16, further comprising:
determining, by the one or more processors, whether the data received by the coil in the body indicates that the power transmitted through the coil in the body meets a threshold voltage of the accessory; and
controlling, by the one or more processors, the coil in the body to stop transmission of power when the data received by the coil in the body indicates that the power transmitted through the coil in the body does not meet the threshold voltage of the accessory.

* * * * *